Figure 1:
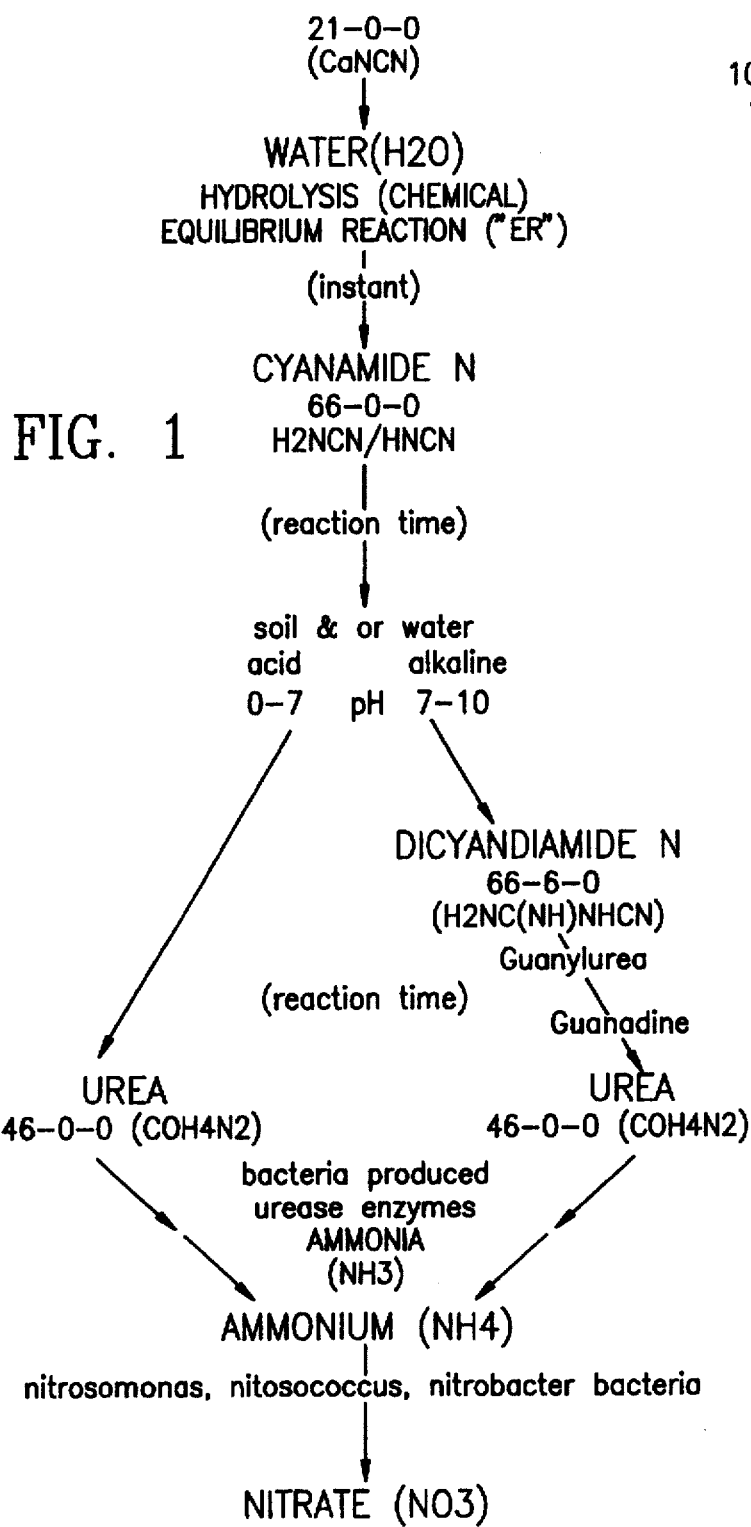

US005698004A

United States Patent [19]
Hartmann

[11] Patent Number: 5,698,004
[45] Date of Patent: Dec. 16, 1997

[54] METHOD AND PACKAGING UTILIZING CALCIUM CYANAMIDE FOR SOIL TREATMENT

[76] Inventor: Richard O. W. Hartmann, 1827 S.W. Beaverton Hwy., Portland, Oreg. 97201

[21] Appl. No.: 734,193

[22] Filed: Oct. 21, 1996

[51] Int. Cl.$^6$ .................................................. C05C 7/00
[52] U.S. Cl. ........................................... 71/55; 71/63
[58] Field of Search ................................. 71/1, 55, 63

[56] References Cited

FOREIGN PATENT DOCUMENTS

| 4029755 | 3/1992 | Germany | 71/63 |
|---------|--------|---------|-------|
| 1647002 | 5/1991 | U.S.S.R. | 71/63 |

*Primary Examiner*—Ferris Lander
*Attorney, Agent, or Firm*—John J. Byrne

[57] ABSTRACT

Processes and structures for using calcium cyanamide fertilizer in a manner to greatly enhance its most effective soil treatment form prior to its application. Calcium cyanamide transformation structures have both fertilizing and pesticidal qualities; however, it is difficult to obtain uniform, efficient effectiveness from dry calcium cyanamide's liquid transformation structures. In the process of this invention, dry, dusty granules and fines of calcium cyanamide are placed directly into tanks of liquid for transformation or within biodegradable bags through which water can freely flow. The bags are submerged in a tank of water. The insoluble calcium and carbon components thereof remain as solid residuals within the bags. Hydrolysis occurs and the solution is biocidal and ready for immediate application. The solution can be sprayed or irrigated onto a targeted soil area with conventional dispersal equipment. The remaining non-dissolved material in the bags can be dispersed on and into the plant crop soil. Additives of other fertilizers into the above solution can be used to enhance effectiveness. When the calcium cyanamide is placed directly into the liquid, the mixture will become slurry-like. In the processes herein, when the solids of calcium cyanamide are not isolated during hydrolysis, the slurry mixture is utilized in recent modern specialized solids fertilizer suspension dispersed equipment having sufficient agitation to keep the solids in suspension.

8 Claims, 2 Drawing Sheets

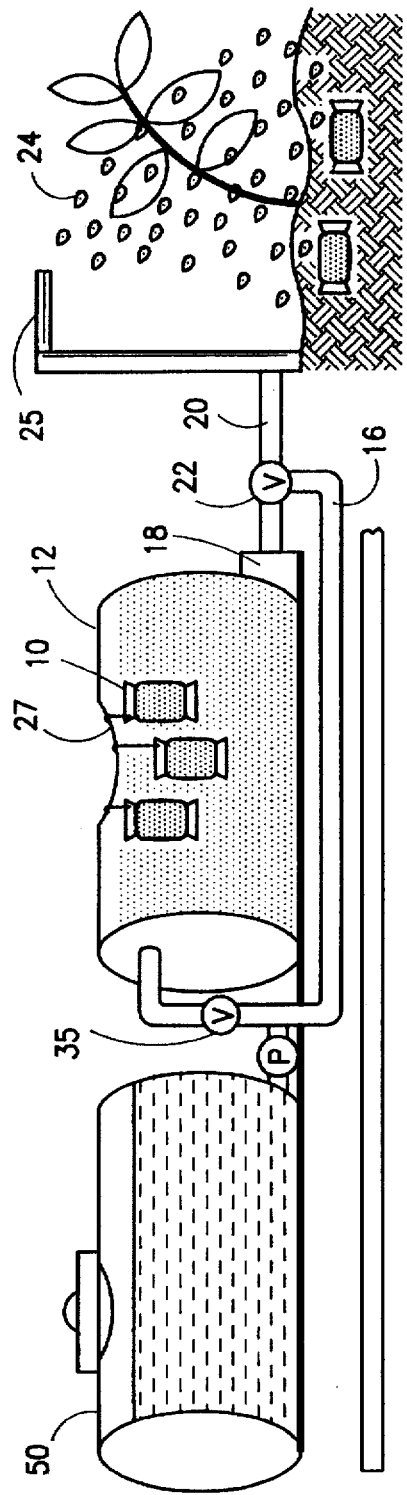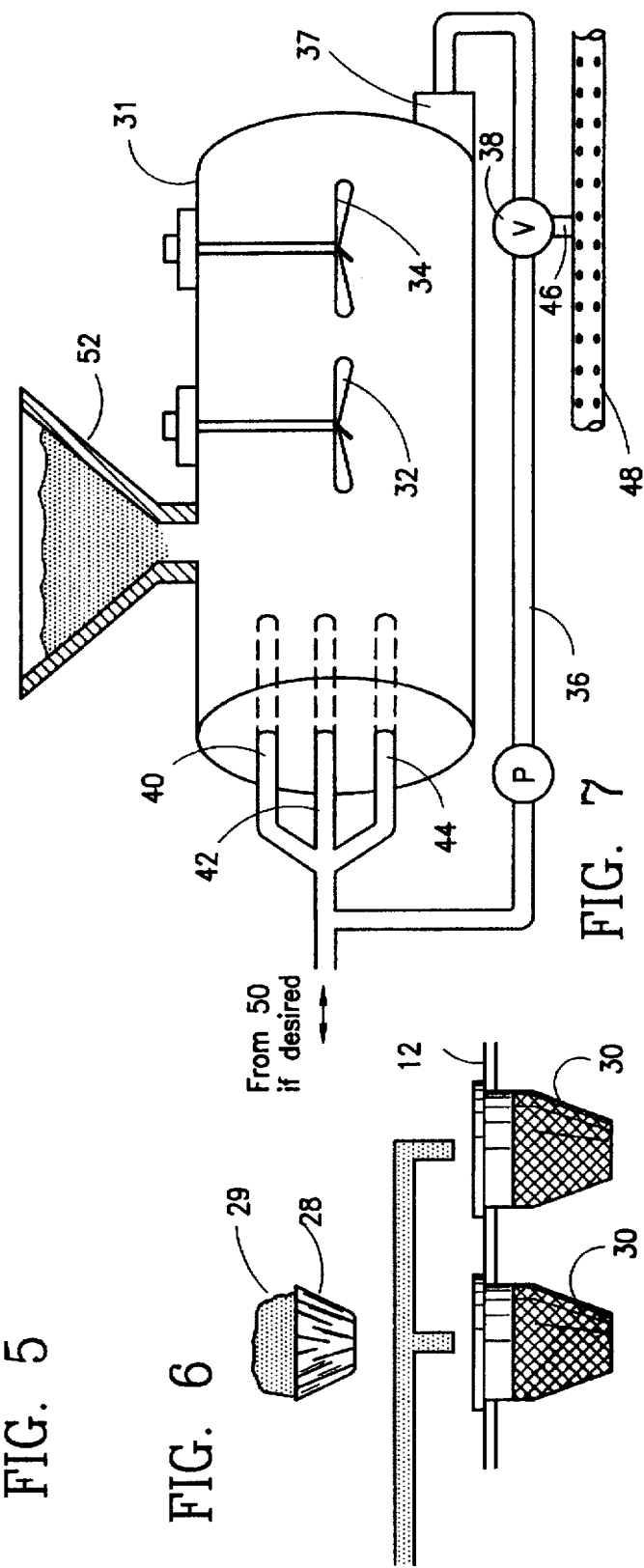
FIG. 5
FIG. 6
FIG. 7

METHOD AND PACKAGING UTILIZING CALCIUM CYANAMIDE FOR SOIL TREATMENT

BACKGROUND AND PRIOR ART

The use of calcium cyanamide as a pre-plant/emergence treatment of soil dates back approximately one hundred years. For the most part, it has been topically applied as an insoluble, dry nitrogen fertilizer having some pesticidal qualities dependent on latent or applied moisture conditions. There are prior art publications recommending high rates of application, 200 pounds to 2000+ pounds per acre, to reduce crop competitive plants, weed seeds, soil animals and microorganisms. Calcium cyanamide has long been recognized as a nitrogen fertilizer having both fertilizing and pest control effects. At those rates its pest control uses have, for economic and practical reasons, disappeared in the United States in favor of select pesticides.

Contrary to calcium cyanamide, many of today's commonly used nitrogen fertilizers are immediately water soluble and they or their normal metabolites are directly plant leaf and root absorbable. These nitrogen fertilizers, or their metabolites, have been shown to create areas detrimental to plants, seeds, animals and microorganisms that are competitive to commercial crops. Also, certain caustic fertilizers described hereinafter do likewise. These products alone, however, have not been satisfactorily perfected as plant protectants.

Recommendations for applying calcium cyanamide fertilizer at levels below 200 pounds per acre have not heretofore been recommended. As an example of the effectiveness of the processes taught herein, the prior art teaches a 41% nematode reduction using 427 pounds per acre of calcium cyanamide in "ideal wet" soil versus an 86% reduction resulted using on 20 pounds per acre when the processes described herein are followed.

For various reasons, the use of calcium cyanamide as a dry nitrogen fertilizer treatment has dropped dramatically in United States agriculture in favor of soluble nitrogen fertilizers. These reasons include calcium cyanamide's comparative high energy dependent unit cost. A second reason is its historically high-rate biocidal cost compared to recently developed pesticides. Thirdly, its dry, dusty noxious fines makeup is undesirable for human handling and difficult to measure and calibrate alone or with other fertilizers for maximum effectiveness. A higher cost, lower analysis pelletized form improves, but does not eliminate, direct dry application handling problems. Fourth, several of calcium cyanamide soil beneficial components, namely calcium and carbon, will clog standard liquid spray applicators if one attempts to dissolve it in water for efficient dispersal.

FIELD OF THE INVENTION

One of the principal advantages of this invention is to eliminate the necessity of applying (dispersing) calcium cyanamide (CaNCN) on soil in the product's dry, dusty form. The methods herein described not only eliminate this necessity, but vastly improve the product's performance. The invention incorporates several methods for efficiently using calcium cyanamide for soil treatment by utilizing recently developed fertilizer equipment now used for the liquid suspension of other insoluble fertilizer applications with or without other fertilizers and/or pesticides.

Commonly available liquid spray or irrigation injection equipment could not be used heretofore because a mixture of calcium cyanamide in water clogs the equipment due to the insolubility of certain components of calcium cyanamide, namely calcium and carbon. To correct this, the invention utilizes filter quality shipping bags and other containers in tanks to capture the insoluble components.

Agricultural soils are a complex, physical, chemical, and biological biosphere. When man makes the soil rich with fertilizers for desirable plant growth, it likewise becomes more attractive to competitive unwanted weeds and other growths which can hinder desired crop production. Thus, a product with initial pesticidal qualities and later plant food qualities is very desirable, especially for pre-planting treatment and post-plant treatment.

An objective of this invention is to make calcium cyanamide's water-hydrolyzed cyanamide nitrogen reactant immediately fully active before and/or during soil diffusion application of the product and, thus, many times more commercially effective. This removes dependence on latent or time-lagged separate moisture treatment and soil incorporation.

Other objectives of this invention are to (i) use calcium cyanamide in a manner to initially increase the detrimental effects against competitive growths to the desired crops, and (ii) prevent soil leaching loss and soil stabilizing of its own N metabolites and other latent soil N forms or those from other N fertilizers using the fully active, hydrolyzed cyanamide nitrogen form, hereinafter referred to as cyanamide N, also known to enhance its known trait of interim debilitating soil microorganisms which convert soil affixed N forms to environmentally, undesirable leachable nitrate N forms.

A still further objective, contrary to food crop residue pesticides, is to provide a non-residue fertilizer for pest control up through the pest critical harvest threshold.

Another objective is to synergistically achieve the above effects with other fertilizers.

Because of the high liquid-to-insoluble fertilizer/pesticide ratio and the calcium cyanamide liquification processes of this invention, the negative handling characteristics of the dusty, noxious, diffuse factory fine particles are no longer air-polluting dusty or noxious. The fines are changed from an undesirable application trait, becoming more uniformly dissolvable, calibratable to an acceptable degree of accuracy, and dispersible by fertilizer suspension apparatuses or common liquid applications. This affords a quick equilibrium reaction to make soluble cyanamide N effective prior to and during application. It allows the use of soluble fertilizer additives for pH adjustment to alkaline sites. It allows synergism with simultaneously applied plant foods having similar plant food and pesticidal effects. It improves its known effect of preventing off site leaching of crop valuable and useable nitrogen plant foods which are undesirable to other animal and human habitats. The above effects broaden and increase the invention's effectiveness many fold and, therefore, reduce amounts formerly required to offset innate site variables of chemical soil traits and moisture. In the case of simultaneous irrigation injection, partial cyanamide N decomposition and the separate soil drying mechanical soil incorporation is eliminated. All of the above creates new economic life with agriculturally affordable dosages and human and environmentally desirable handling traits.

Summarizing, the following advantages and objectives are gained by utilizing the processes described herein:

1. Dust exposure of fines/granules to humans are essentially eliminated.

2. Application accuracy is improved by permitting a liquid application versus irregular fines/granules spreading.

3. Dusty, low-cost factory fines can be utilized and are actually preferred.

4. Sludge-clogging stoppages for liquid delivery are substantially reduced or eliminated.

5. A controlled hydrolysis equilibrium reaction is assured.

6. One can readily adjust liquid product to account for the alkalinity or acidity of the soil or soil water that is likely to be encountered.

7. Synergistic effects are achieved by the mutual utilization of the commonly known bio-active traits of CaNCN and the pH stabilizing effect of bio-active caustic nitrogen and other fertilizers when mixed and used in the described process. Such mutual bio-activity, when combined, synergistically lowers the separate rates at which each may affect the site.

8. The processes reduce losses to air that occurs when using dry applications.

9. Substantially lowers dosages, 10–20 fold (pounds per acre), are effective.

10. The processes make pinpoint site delivery possible of the neutralization effect of detrimental delayed acidification of the simultaneously applied common soluble nitrogen forms.

11. The processes reduce nitrate loss to ground water of calcium cyanamide and all simultaneous soluble nitrogen forms.

12. The processes aid in the goal of "Integrated Pest Management" (IPM) by affording a reduction of pesticide use, which is potentially harmful to the environment.

As stated above, the processes and methods described herein make it possible to apply calcium cyanamide as a pesticide/fertilizing agent, utilizing available dispersal equipment and containers. Additionally, the processes described herein use high ratios (14x+) of water to commercial product before application on the targeted soil. When calcium cyanamide is mixed with water at these ratios, a completed equilibrium hydrolysis transformation reaction is immediately created.

This invention permits the use of existing agricultural field application processes, namely solid suspension/fluid hand and mechanical applications, dispensing into irrigation projects, and biodegradable filter packaging or filtering. Liquid pre- and post-plant application methods can be used effectively if dosage is controlled. With any of these processes, soluble and/or liquid fertilizers and/or other caustic or acid fertilizer can be added to control alkalinity or acidity. Also, the improvement of a synergistic effect can be achieved by combining with the known, but unperfected, pesticidal effects of common nitrogen fertilizers.

BRIEF DESCRIPTION OF THE DRAWINGS

FIG. 1 is a diagrammatic/schematic view of a chain of chemical events;

FIG. 2 is a plan view of a filter bag;

FIG. 3 is the bag of FIG. 2 filled with calcium cyanamide;

FIG. 4 is a diagrammatic representation of a container housing plurality of the bags shown in FIG. 3;

FIG. 5 is a diagrammatic view of a fertilizer system;

FIG. 6 is a diagrammatic view of a filter bag supported by a screened and

FIG. 7 is a diagrammatic view of a tank with agitator blades therein.

DESCRIPTION OF THE PREFERRED EMBODIMENT

In FIG. 1, there is shown a diagrammatic/schematic view illustrating the basic chain of events which occur when calcium cyanamide is applied in its dry, dusty form. This was the common application method used prior to the processes described herein. After mechanical incorporation, it was necessary in most instances to spray water over the area on which the product had been spread in order to complete the hydrolysis action. With the application of water, cyanamide N was formed to one extent or another. With this prior art method, the hydrolysis to cyanamide N partially begins in the innate soil moisture and dissipates depending on temperature, acidity, alkalinity, etc. This is followed by delayed mechanical soil drying incorporation, which is followed by subsequent watering or rain for hydrolysis of the remaining dry CaNCN. Because of the irregular and haphazard formation of the cyanamide N, its value as a pesticide was dissipated. As will be seen hereinafter, the process of this invention regularizes the hydrolysis and maximizes the intensity and duration of the cyanamide N for immediate maximum biocidal action.

As seen in FIG. 1, if the soil and water are acidic—that is, having pH factor of 0to 7, urea is rapidly formed from cyanamide N which will thereafter change to soil-affixing ammonium and leachable nitrate N forms. Urea, ammonium and nitrates are beneficial to the plants as plant food. It is the initial full biocidal action of cyanamide N, however, that is sought without losing its—and its metabolite's—beneficial fertilizer effects. If the calcium cyanamide is dispersed on a pH 7–10alkaline soil, or if the water with which it is mixed is pH 7–10alkaline and the soil acts as a filter of the contained calcium, the cyanamide N is quickly converted to dicyandiamide, which is not biocidal. As the chemical reaction continues, the product will convert to urea, ammonium and nitrate, as shown previously. As herein described, the pre-addition of a caustic fertilizer to assure a pH of 10–causes the anion of cyanamide N to stay and remain biocidal in alkaline soils until it goes to urea, etc.

In order to obtain the combined benefit of calcium cyanamide as a pesticide and a fertilizer, the formation and preservation of cyanamide N is essential. It is the cyanamide N that will act as the pesticide, and it should be fully and completely dispersed on the targeted soil shortly after its formation. Although processes hereinafter described are for pre-planting application, experimentation currently underway proves these processes successful for both pre-planting and post-planting environments.

As stated previously, calcium cyanamide is dusty, noxious and difficult to handle. If mixed with water, spreading is not readily accomplished because of certain insoluble products which resist going into solution with the water. This will cause clogging in ordinary liquid dispersing machines.

Metabolization direction of the cyanamide N is affected by the acidity or alkalinity of the water and soil. In alkaline soils, cyanamide N between pH 7–10quickly becomes dicyandiamide, which, although bio-static to N converting bacteria, cannot be termed biocidal. When alkaline soils are to be treated, therefore, the cyanamide N should be mixed in a solution to which caustic fertilizer has been added. This will overcome the soil filtering of the small amount of contained caustic calcium, thus maintaining a pH above 10 so that cyanamide N anion form remains bio-effective. It will then pass either to dicyandiamide or directly to urea, etc.

Thus, it can be seen that liquidization allows for accurately tailoring (calibrating) calcium cyanamide with other fertilizers to prep for various soil and water conditions. After testing, additional soluble and/or liquid caustic or acid fertilizer can be added until the desired pH is obtained. Proper mixtures regularize the chemical reactions. Liquidization also eliminates human exposure to noxious fines and permits one to accurately judge the amount of acidity or alkalinity to be added for maximum effectiveness.

Figure 2:
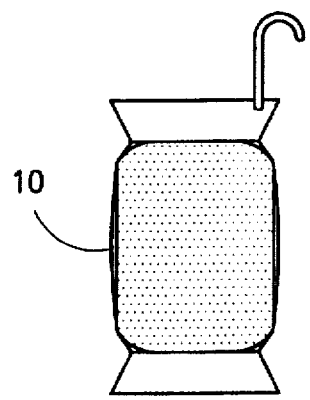

FIG. 2 is a plan view of a biodegradable filter bag 10 which can be filled with calcium cyanamide. Water is permitted to flow therethrough, thus hydrolyzing it to soluble cyanamide N, capturing the carbon and calcium in the bag.

Figure 3:
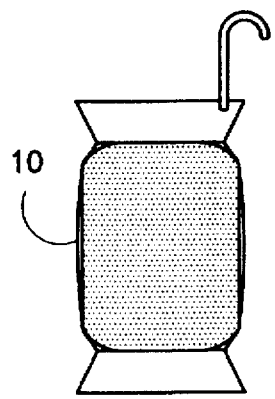
Figure 4:
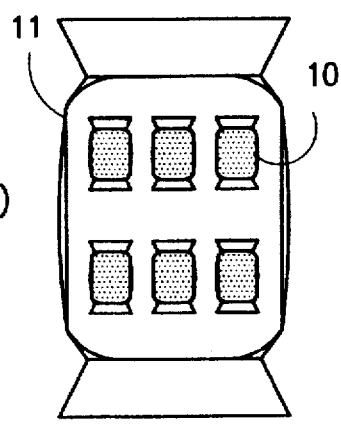

FIG. 3 is the bag shown in FIG. 2 filled with calcium cyanamide. FIG. 4 is merely a diagrammatic representation of a large container 11 that can house a plurality of bags 10 shown in FIG. 3. Such a container can be hermetically sealed and used for purposes of transportation and storage.

As seen in FIG. 5, a plurality of bags 10 are suspended within a tank 12 containing water and/or liquid fertilizers. The bags 10 will act as tea bags through which the liquids can flow. In order to cause the flow, the assembly is equipped with a conduit 16 which extends from the lower part of one tank end to an upper level at the other end of the tank. Intermediate the length of the conduit 16 is a pump 18 which will cause a recirculation flow of the fluid in the tank so that water will pass through the bags 10 until the soluble cyanamide goes into solution. FIG. 5 also shows the bags 10 suspended in the tank via strings or handles. The insolubles, primarily calcium and carbon, will be retained in the bags 10. These bags are made of a porous material such as paper, cloth, or the like. The interstices in the material of bags 10 must be small enough to prevent the escape of the insoluble calcium and carbon, but large enough to permit water or a similar liquid to pass therethrough. The sealed shipping containers can be provided with tear strips or the like for easy removal of the bags and/or the contents thereof. After sufficient recirculation, a clear liquid is sent to exit line 20 upon activation of a valve 22. This clear liquid 24 can be used with, and will not clog, common conventional liquid spreaders or irrigation injectors. The solution is then dispersed over the targeted soil. The biodegradable bags 10, now containing the calcium and carbon, are subsequently removed and placed on or plowed into the same or similar targeted soil sites. In this manner, none of the original calcium cyanamide or containers is wasted and separate disposal is not required because all of it is soil/plant beneficial.

The liquid exiting line 20 can be sent directly into an irrigation system 24 or to a liquid fertilizer sprayer or injector diagrammatically represented by the numeral 25. In the field, this method is known as the tea bag method.

A "coffee" method also can be used. Filter-quality cup-shaped bags 28 having looped strings or handles are supported by a screened supporting basket 30. The calcium cyanamide granules and fines are deposited in these biodegradable bags 28 as one deposits coffee in a filter bag in the common home coffee maker.

In FIG. 6, the tank 12 is equipped with a strainer basket 26 fine enough to support a filter liner 28 to retain the fines and granules. This filter liner material has approximately the same characteristics as the bags 10. When the strainer basket/filter combination is used, the calcium cyanamide can be deposited right into the filter liner from one of the bags 10 or directly from another container. As in FIG. 5, there will be means to circulate water within the tank so that the liquid will absorb the solubles. It should also be noted that in FIGS. 5 and 6, a second tank 50 is available to contain other liquid fertilizers. Proper amounts of these fertilizers can be measured into tank 10 for a proper pH factor and for the required plant food treatment tailored for the soil, plant and water conditions which are to be treated by the combination.

In the methods described above, it can be seen that the insolubles are retained in biodegradable bags. The liquid component can be dispensed by conventional equipment.

In FIG. 7, there is shown a tank 31 which has agitation blades 32 and 34 disposed therein and a conduit 36 leading from one end of the tank to the other. Conduit 36 is equipped with a heavy duty pump 37 and valve 38. If desired, the conduit 36 can be split into three branches at the entry end of the tank, namely at 40, 42, and 44. This will help distribute the circulating liquid, or slurry, throughout the tank. In this instance, the insolubles, such as calcium and carbon, cause the liquid to become slurry-like. It is important, therefore, that considerable agitation, with or without suspension agents, is available so that the carbon and calcium remain in suspension until the product is exhausted through the conduit 46. The conduit 46 leads either to an irrigation water injection system or to a recently developed spreader equipped to distribute a solids suspension-like product (e.g., gypsum). Apparatuses and processes for handling insolubles in liquid suspension are known to the prior art.

When the commercial cyanamide fertilizer is mixed with sufficient water (14x+) in tank 12, complete hydrolysis occurs and the component cyanamide N becomes immediately bio-effective and remains so, subject to tank content temperatures staying below 70° F. With line and irrigation water temperatures usually being 50° F. to 60° F., cyanamide N stability to the site as a plant food and pesticide can be expected. The cyanamide N being nitrification bacteria debilitating causes the urea metabolites to be long lasting and not leaching for weeks thereafter. After the liquid has been sprayed on the targeted soil site, the calcium and carbon-containing bags are distributed over the same or similar targeted soil. The bags and the calcium and carbon will disintegrate and beneficially become part of the soil.

Another tank 50 is disclosed for containing a liquid fertilizer having either a low or a high pH factor. Such fertilizer can be used to tailor the ultimate liquid in tank 12 for the site soil that is to be encountered.

In practice, the practitioner will predetermine the acidity or alkalinity of the soil and water to be treated. The solution in tank 12 may be pre- or post-hydrolysis tested and then supplemental fertilizer from tank 50 may be added, if necessary, to obtain the proper pH for the water and/or soil to be treated.

It is important to observe that the calcium cyanamide fertilizer is mixed with water prior to application so that hydrolysis occurs and the available cyanamide N is preformed. The processes permit the cyanamide N to be quickly applied to the targeted soil before its deterioration. Irrigation injection liquid application causes an even distribution and good soil penetration. For topical liquid application, immediate ground plowing is recommended for improved penetration.

The invention has been described with respect to certain preferred embodiments but is subject to variation within the scope of the appended claims. Reference should be made to the following claims rather than the foregoing specification as indicating the true scope of the invention in which exclusive rights are claimed.

I claim:

1. A process of preparing and applying calcium cyanamide fertilizer comprising the steps of providing porous containers containing calcium cyanamide;

providing a tank of liquid;

suspending the containers in said liquid until calcium and carbon are separated therefrom, dissolving the remaining portion in said liquid;

treating said solution to attain a desired pH factor;

removing said containers from said solution after hydrolysis occurs; and dispersing said solution over an area to be treated.

2. The process of claim 1 wherein said calcium cyanamide in said containers includes is dry insoluble fines and granules.

3. The process of claim 2 wherein the liquid parts in said tank exceed the parts of calcium cyanamide fertilizer by more than a (14× +) to one ratio.

4. The process of claim 3 wherein said contents of said containers are evenly dispersed over said area to be treated.

5. The process of claim 1 wherein said liquid is water.

6. The process of claim 3 wherein said liquid is water.

7. The process of claim 1 wherein additional fertilizers are added to said liquid to synergistically enhance the effects of each other whereby a lower effective dose of each achieves a greater effect than either applied separately.

8. The process of claim 1 wherein the process includes adding a caustic to said calcium cyanamide prior to its application to an alkaline site to assure a pH at or above 10 to maintain a cyanamide anion biocidal to thus avoid premature transformation to non-biocidal dicyandiamide.

* * * * *

UNITED STATES PATENT AND TRADEMARK OFFICE
CERTIFICATE OF CORRECTION

PATENT NO. : 5,698,004
DATED : December 16, 1997
INVENTOR(S) : Richard O.W. Hartmann It is certified that error appears in the above-indentified patent and that said Letters Patent is hereby corrected as shown below:

Column 4, line 20, "0to" should read --0 to--.

Column 4, line 27, "7-10alkaline" should read --7-10 alkaline--.

Column 4, line 28, "7-10alkaline" should read --7-10 alkaline--.

Column 4, line 34, "10-causes" should read --10-14 causes--.

Column 4, line 52, "7-10quickly" should read --7-10 quickly--.

Signed and Sealed this

Twenty-eighth Day of July, 1998

*Attest:*

BRUCE LEHMAN

*Attesting Officer*     Commissioner of Patents and Trademarks